United States Patent [19]

Nuss

[11] Patent Number: 5,947,141
[45] Date of Patent: Sep. 7, 1999

[54] FOAM INDUCTOR SYSTEM AND METHOD OF USING SAME

[76] Inventor: Galen L Nuss, 2746 - 250th St., Readlyn, Iowa 50668

[21] Appl. No.: 09/047,004

[22] Filed: Mar. 24, 1998

[51] Int. Cl.⁶ ..................................................... B01F 3/08
[52] U.S. Cl. ............................................... 137/3; 137/268
[58] Field of Search ....................... 137/268, 3; 422/255, 422/256; 239/10, 310, 314

[56] References Cited

U.S. PATENT DOCUMENTS

| | | |
|---|---|---|
| 2,188,066 | 1/1940 | Timpson . |
| 2,296,739 | 9/1942 | Ray ......................................... 422/256 |
| 3,185,170 | 5/1965 | Westman ................................. 422/256 |
| 3,618,856 | 11/1971 | Sachnik . |
| 3,979,326 | 9/1976 | Chatterton . |
| 4,620,983 | 11/1986 | Zimmer ....................................... 427/8 |
| 4,728,536 | 3/1988 | Burley et al. ............................ 427/154 |
| 4,729,434 | 3/1988 | Rohrbach . |
| 4,764,536 | 8/1988 | Proksa et al. . |
| 4,933,115 | 6/1990 | Krippl et al. . |
| 5,570,539 | 11/1996 | Smith, Jr. . |
| 5,575,111 | 11/1996 | Rajamannan . |

*Primary Examiner*—Kevin Lee
*Attorney, Agent, or Firm*—Zarley, McKee, Thomte, Voorhees & Sease

[57] ABSTRACT

A water tank is connected through a pump and a valve to an inductor container which in turn is connected through a valve to a foam holding tank which is pressurized by it being connected to an air compressor for delivering foam to an outlet for providing a foam guideline on the ground. The valves into and out of the inductor container are first closed and then the inductor container is filled with liquid foam. The valves are then opened and water under pressure is delivered to the inductor container where it is mixed with the foam and then delivered into the foam holding tank. The valves are again closed and a drain valve on the inductor container is opened to removed water from the inductor container in preparation for the next filling cycle.

3 Claims, 2 Drawing Sheets

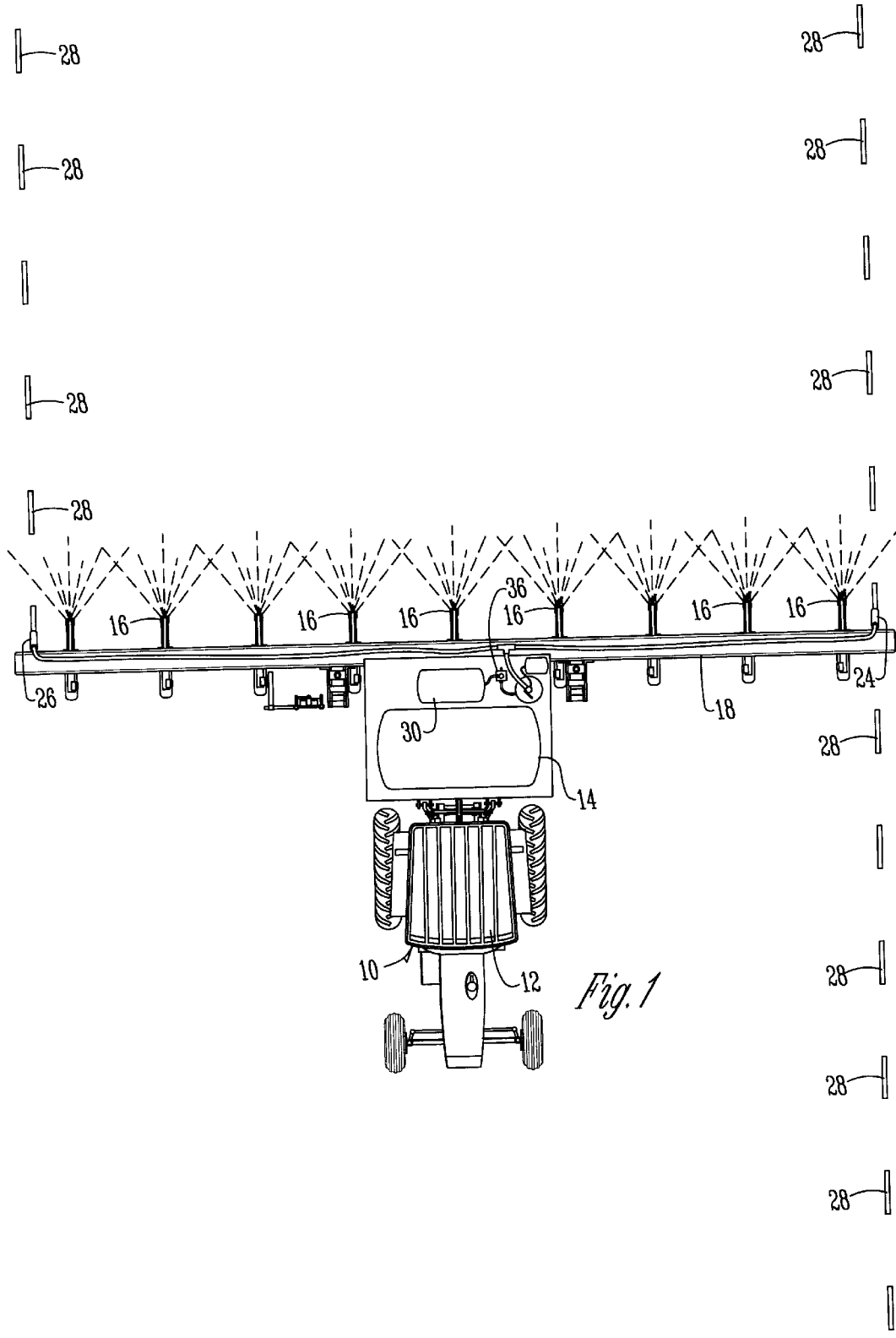

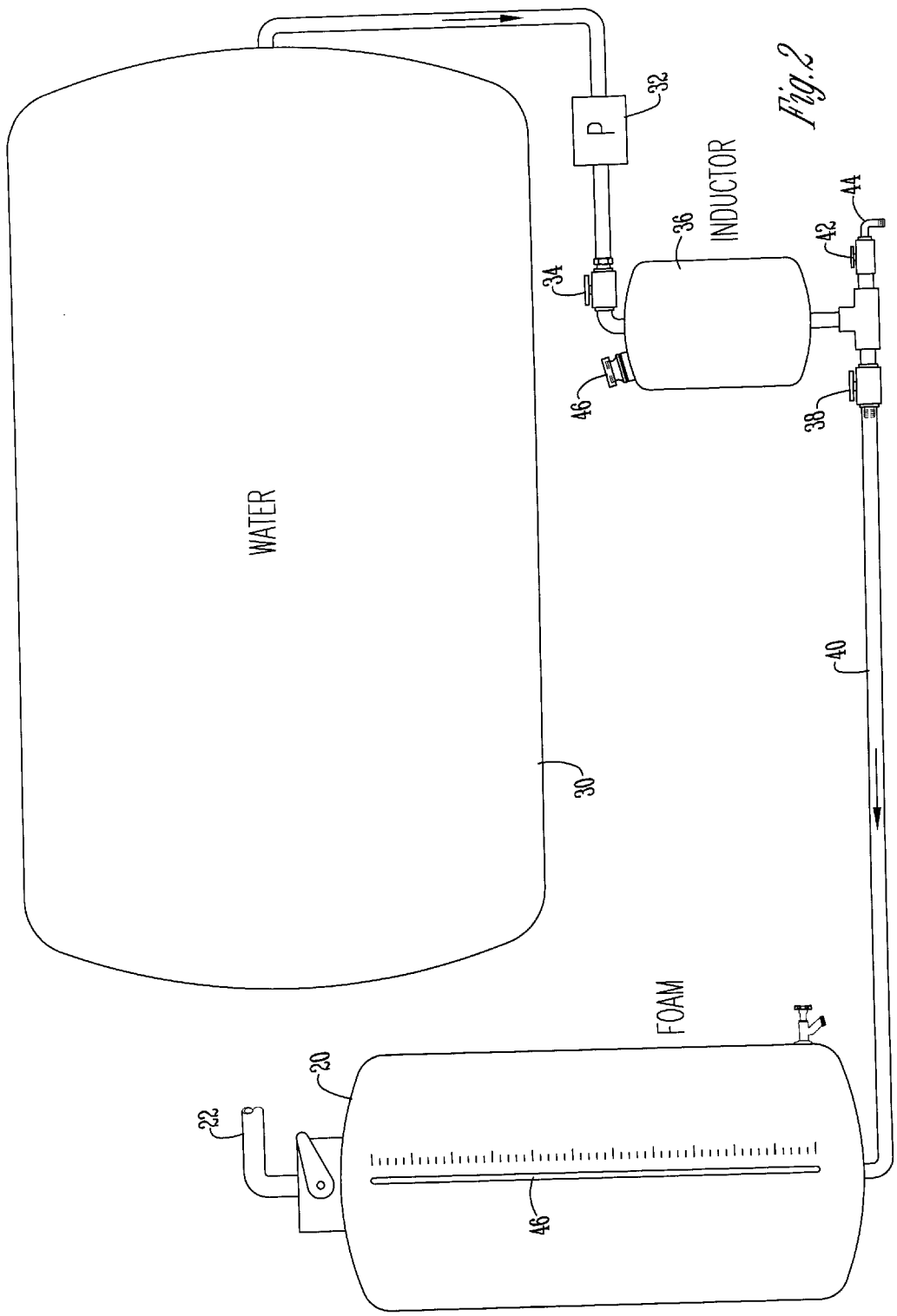

FOAM INDUCTOR SYSTEM AND METHOD OF USING SAME

BACKGROUND OF THE INVENTION

The application of chemicals to the ground in a farm field including fertilizer and weed spray require a ground marking system for the vehicle operator to observe guideline markings in making trips back and forth across the field to assure that the chemicals are uniformly applied to the ground. The marking is commonly provided through the use of foam being applied to the ground in a broken line as disclosed in U.S. Pat. No. 5,570,539 Nov. 5, 1996.

Typical foam marking equipment includes an air pressurized foam holding tank into which liquid foam and water are introduced. The problem is that the liquid foam will spew out of the fill opening onto the operator and the equipment when liquid foam is being introduced into the foam holding tank. The liquid foam may contain dyes which will leave discolored stains on the equipment. Thus, what is needed is a system for refilling the foam holding tank with liquid foam and water without foam being spread uncontrollably over the operator and equipment.

SUMMARY OF THE INVENTION

Liquid foam is introduced into the foam holding tank by first being poured into an inductor container which is isolated from the foam holding tank by a valve being closed therebetween. A water tank is connected to the inductor container through a pump and valve. An inductor container includes a drain valve. Steps for filling the foam holding tank include, first closing the valve between foam holding tank and the inductor container. The valve between the water tank and the inductor container is also closed. Next, liquid foam is introduced into the inductor container through a fill opening which is closed after the filling step has been completed. The valve between the foam holding tank and the inductor container is then opened along with the valve between the water tank and the inductor container. The pump is then operated to transfer water into the inductor container which in turn mixes with the liquid foam and is transferred into the foam holding tank. The water passing through the inductor container will totally clean the inductor container of any foam. The valve between the foam holding tank and the inductor container is then closed and the drain valve is operated to empty the inductor container of any water and the process is repeated when additional foam in the foam holding tank is needed.

DESCRIPTION OF THE DRAWINGS

FIG. 1 is a top plan view of a mobile chemical spray machine having a foam line marking system on which the liquid foam inductor system of this invention is used.

FIG. 2 is a diagrammatic view of the components in the liquid foam induction system.

DESCRIPTION OF THE PREFERRED EMBODIMENT

The mobile chemical spray equipment is shown in FIG. 1 and referred to generally by the reference numeral 10 and includes a prime mover 12 which carries a chemical tank 14 connected to chemical spray nozzles 16 mounted on a boom 18.

The liquid foam inductor system of this invention includes a liquid foam holding tank 20 having an outlet line 22 which selectively distributes foam to left and right dispensers 24 and 26 for leaving foam lines 28 on the ground. In FIG. 1 the operator of the prime mover 12 observes the left foam line 28 while leaving a new foam line 28 on the right end of the boom 18 to be followed on the next trip across the field. A water tank 30 is connected through a pump 32 and a control valve 34 to an inductor container 36, in turn connected to a control valve 38 by a line 40 to the foam holding tank 20. Additionally, a valve 42 is provided in a drain line 44.

In operation, when the foam holding tank 20 needs filling the valves 34, 38 and 42 are closed and an inductor container fill open cap 46 is removed. The liquid foam is then poured into the inductor container 36 in a predetermined quantity and the cap 46 is replaced. Next, the valves 34 and 38 are opened and the water pump 32 is operated to supply a mixture of water and liquid foam to the foam holding tank 20 through the inductor container 36. A gauge 46 on the outside of the foam holding tank 20 indicates the volume of liquid in the foam holding tank. When the predetermined amount of liquid has been supplied to the foam holding tank 20 the pump 32 is stopped and the valves 34 and 38 are closed and the drain valve 42 is opened to drain the inductor container 36 of water. The system is now ready for the filling cycle to be repeated. This has all been done without any foam having escaped onto the operator or the equipment. At the time the inductor container is filled with liquid foam the inductor container is clean, empty and unpressurized allowing for a trouble-free filling operation to be performed. Water is not only mixed in the inductor container with the liquid foam but also cleans out the inductor container in the process.

Chemical and foam applicator machines are available from various manufacturers including Ag-Chem Equipment Co., Minnetonka, Minn. The foam when applied to the ground is similar to shaving cream with the soap concentrate to water being from 40 to 120 to 1. The size of the various containers may vary but a typical system would include a 110 gallon water tank. The preferred size of the cylindrical inductor container is one-and-half gallon capacity. The foam holding tank 20 will vary in size between 20 to 60 gallons.

The problem this invention overcomes is perhaps better understood by the fact that if the operator were to wait until all of the foam in the foam holding tank had settled to the bottom a wait of five to seven days would be required. The operator normally expects to refill the foam holding tank within 10 minutes after it is so empty that it can no longer provide a foam marking line. The inherent nature of foam is for it to spew out any opening available to it including the fill opening in the conventional liquid foam holding tank. The invention of this application overcomes this problem and additionally produces a substantial financial saving by avoiding liquid foam being wasted.

What is claimed is:

1. A foam induction system, comprising, a pressurized liquid foam holding tank having inlet and outlet lines, a pressurized water supply source having an outlet line, and a liquid foam inductor container having a water inlet connected to said water supply outlet line through a water control valve, a liquid foam outlet connected to said liquid foam holding tank inlet line through a control valve, and a liquid foam inlet opening for introducing liquid foam into said inductor container for being mixed with water delivered to said foam inductor container and delivery to said liquid foam holding tank.

2. A method of filling a liquid foam holding tank comprising the steps of, providing a pressurized liquid foam holding tank connected through a control valve to an inductor container having a liquid foam inlet opening and being connected through a control valve to a pressurized water source, closing the control valve between said liquid foam holding tank and said inductor container, delivering liquid foam into said inductor container through said liquid foam inlet opening, closing said liquid foam inlet opening, opening said control valve between said liquid foam holding tank and said inductor container, and opening said control valve between said pressurized water source and said inductor container, delivering water into said inductor container for mixing with said liquid foam and being transferred to said liquid foam holding tank, and closing said control valve between said holding tank and said inductor container.

3. The method of claim 2 further including the step of providing a drain valve on said inductor container and operating said drain valve for emptying water from said inductor container after the step of transferring water and liquid foam to said liquid foam holding tank has been completed.

* * * * *